Oct. 31, 1961   R. E. MEYER   3,006,431
APPARATUS CONNECTING THE SAFETY BELT WITH
THE SAFETY APPLIANCE
Filed Aug. 4, 1958
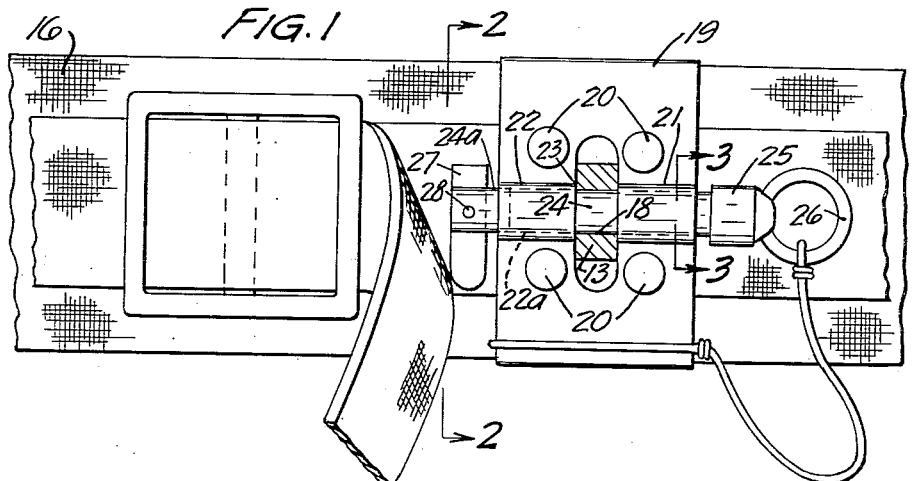
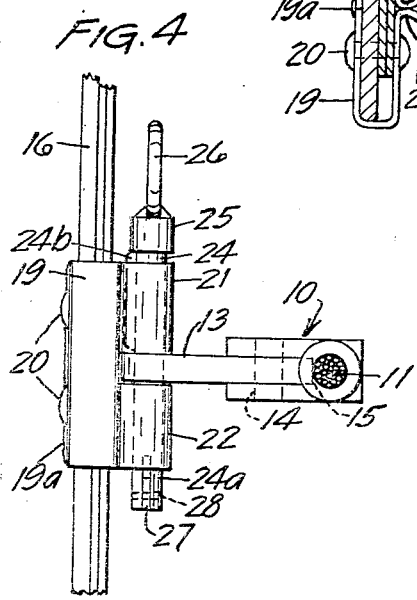
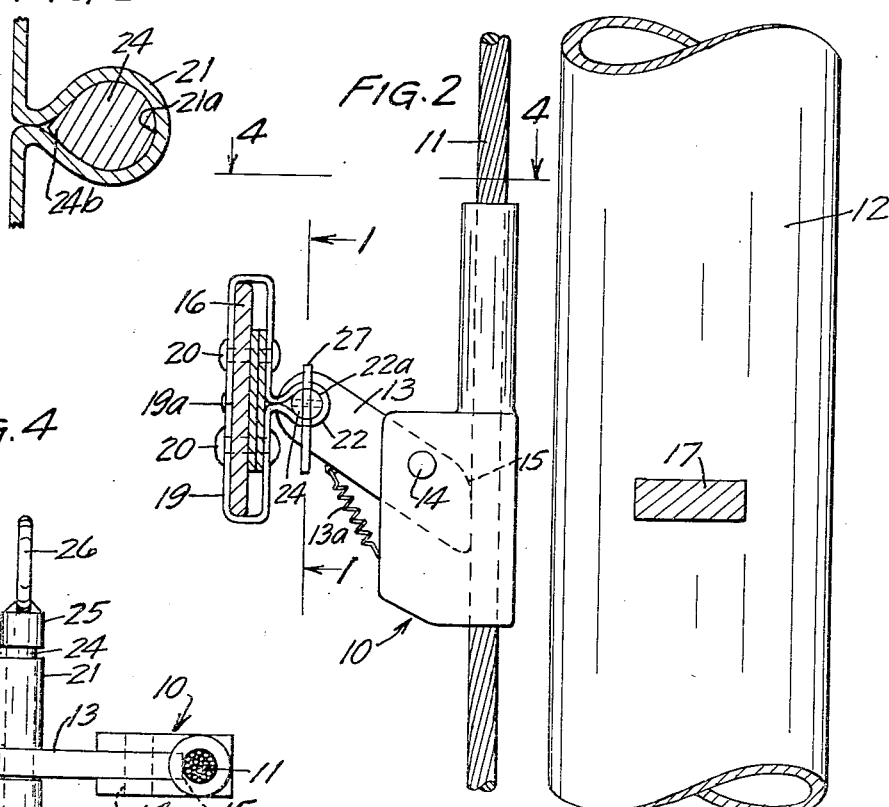
INVENTOR
ROY E. MEYER
BY
Williamson, Schroeder & Palmatier
ATTORNEYS United States Patent Office 3,006,431
Patented Oct. 31, 1961

3,006,431
APPARATUS CONNECTING THE SAFETY BELT WITH THE SAFETY APPLIANCE
Roy E. Meyer, Red Wing, Minn.
Filed Aug. 4, 1958, Ser. No. 752,989
4 Claims. (Cl. 182—5)

This invention relates to an apparatus for connecting a workman's safety belt or the like to a safety appliance.

Most tall structures incorporate some type of safety device to which a workman may secure his safety belt when working on or climbing the structure. A tower of the type for supporting floodlights or the like may have a vertical cable upon which slides a safety appliance with an operating member arranged so that by merely pulling upwardly on the operating member, the safety appliance slides up along the cable, but in order to move the appliance downwardly, the operating member must be pushed inwardly or swung upwardly. The workman's safety belt may be attached to this operating member, but in the past, certain disadvantages of this arrangement have been experienced. For intsance, it has been found that when the workman is descending the structure, he must employ one of his hands to move the operating member inwardly or upwardly so as to allow the safety appliance to slide downwardly along the cable. Obviously, the workman's hand which is accomplishing this function, could better be applied to hanging on to the structure so as to decrease the possibility of the workman falling or losing his step. Another disadvantage is that in the past, when a somewhat conventional snap is employed between the safety belt and the operating member of the safety appliance, the snap operates as a swingable link between the operating member and the belt. By virtue of the existence of this swinging link or snap, the workman will, at substantially any time upon losing his footing on the structure, be permitted to fall free instantaneously while the link swings to a depending position from the safety appliance, at which time the free fall of the workman is suddenly stopped. As a result of this whip or snapping during the free fall and then sudden stoppage of the workman, a back injury is extremely likely to occur.

With these comments in mind, it is to the elimination of these and other disadvantages that the present invention is directed, along with the inclusion therein of other novel and desirable features.

An object of my invention is to provide new and improved apparatus of simple and inexpensive construction and operation for securing a workman's safety belt or the like to a safety appliance.

Another object of my invention is to provide novel apparatus for connecting a workman's safety belt or the like to a safety appliance in such a manner as to eliminate the whip or snapping of a workman in relation to the safety appliance when he loses his footing and is suspended completely by the safety appliance so as to materially decrease the possibility of a back injury occuring.

Still another object of my invention is the provision of a novel and improved apparatus for connecting a workman's safety belt to the operating member of a movable safety appliance in such a manner as to permit the operating member to be moved by the workman's body without the use of his hands on the safety appliance so as to free his hands for performing other necessary functions when descending the structure to which the safety appliance is connected.

A further object of my invention is to provide an improved and novel apparatus for connecting a workman's safety belt to a movable safety appliance in such a manner that it is extremely unlikely that the safety belt could accidentally be disconnected from the appliance.

These and other objects and advantages of the present invention will more fully appear from the following description made in connection with the accompanying drawings, wherein like reference characters refers to the same or similar parts throughout the several views, and in which:

FIG. 1 is a front elevation detail view of the portion of a workman's safety belt adapted for connected to the operating member of the safety appliance;

FIG. 2 is a section view through the safety belt and connecting apparatus shown applied to the operating member of the safety appliance which is illustrated in side elevation; and FIG. 3 is a detail section view taken on a plane as indicated at 3—3 in FIG. 1;

FIG. 4 is a top plan view of the invention.

One form of the present invention is shown in the drawings and is described herein. The present invention relates to the use of a safety appliance such as the cable-clamping safety device indicated in general by numeral 10 which is constructed to encompass and be slidable vertically on an upright support or cable 11 which is disposed adjacent a tower 12, such as of the type for supporting floodlights for sport stadiums and the like, and the cable 11 is anchored to the tower 12 at the top and bottom thereof. The safety appliance or cable clamping devices 10 has an operating member 13 which in the present case is pivoted to the body portion of the appliance 10 which is swingable upwardly and inwardly toward the cable 11 but in any event, is movable inwardly toward the cable 11, to effect releasing of the appliance 10 with respect to the cable 11 in order to allow the appliance 10 to slide downwardly along the cable. The appliance 10 has means operated by the member 13 to effect locking and releasing of the appliance with respect to the cable and in the particular form of the appliance 10 shown, the inner end portion 15 of the operating member comprises a friction shoe which bears directly against the side of the cable 11 within the body of the appliance 10 so as to prevent downward movement of the appliance 10 when the friction shoe portion 15 bears inwardly against the cable. A spring 13a is provided to normally bias the friction shoe portion 15 inwardly toward the cable so as to normally lock the appliance 10 on the cable.

It will be seen that when an upwardly directed force is exerted against the outer end of the operating member 13, the friction shoe portion 15 will swing slightly away from the cable, and in any event the locking relationship is reduced at least to the extent of permitting the safety appliance 10 to slide upwardly along the cable. However, when a downwardly directed force is applied to the outer end of the operating member 13, the appliance 10 is tightly and securely locked to the cable 11 so that the whole safety appliance including the operating member 13 is immovable in a downward direction due to the frictional relation between the shoe portion 15 and the cable 11. In order to permit downward movement of the appliance 10 along the cable, the operating member 13 must be moved inwardly and upwardly to release the shoe portion 15 out of locking relation with the cable 11.

Normally when a workman is to climb the tower, a safety belt 16 will be placed around the body of the workman in a tight-fitting relation so that substantially no slack exists in the belt when properly adjusted. Frequently, the belt 16 will be substantially tighter around the workman's body than is the conventional belt used by a workman to hold up his trousers. When ascending or descending the tower 12, the workman will climb on the steps 17, and of course his hands will be applied to assist in climbing.

The present invention is concerned with means for effecting a connection between the workman's safety belt 16 and the safety appliance 10 and more specifically the operating member 13 which extends outwardly from the cable 11. To this end, an aperture 18 is provided in the outer rigid end portion of the operating member 13. A rigid structure 19 is affixedly secured to the belt 16 as by rivets 20. The rigid structure 19 is, in the form shown, constructed of rigid, heavy gauge sheet metal which is wrapped around the belt 16 as clearly shown in FIG. 2 and the ends of the rigid sheet metal strap are affixed together as at 19a as by welding. At the front or outside portion of the rigid structure 19 is formed a pair of loops or bights 21 and 22 which are spaced from each other at 23 a distance substantially equal to the thickness of the operating member 13 so as to receive the rigid outer portion of the operating member 13 therebetween. The loop portions 21 and 22 are provided with aligned pin-receiving apertures 21a and 22a respectively, which are aligned with the aperture 18 in the operating member 13 when the operating member is fitted into the space 23.

To effect connection between the operating member 13 and the belt 16, so as to prevent vertical shifting movement and wobbling of the front portion of belt 16 with respect to the operating member 13, a pin 24 is provided to be removably inserted through the aligned apertures 21a, 18, and 22a of the interfitted rigid portions of the operating member 13 and the structure 19 respectively. The pin 24 fits tightly in said apertures so as to prevent any wobbling movement between the operating member 13 and the front portion of the belt 16. It should be noted that the belt 16 is swingable, to a limited extent about an axis extending longitudinally through the pin 24, but this movement is contrasted with any vertical shifting or transverse shifting of the belt 16 with respect to the operating member 13 which is prevented. One end of pin 24 is provided with a rigid head portion 25 having a handle or rigid loop 26 fixed thereto to facilitate ready and easy manual handling of the pin.

Means are provided at the other end of the pin 24 to prevent the pin from being withdrawn, accidentally, from the aligned apertures. In the form shown, the end portion 24a of pin 24 is bifurcated so as to receive a toggle element 27 therein which is mounted on a pivot 28. It will be noted that one end of the toggle element 27 extends outwardly a distance further than the other end so that the longer end will always swing downwardly by gravity. The toggle element 27 is of such width as to be adapted to slide through the aligned apertures 21a, 18 and 22a when the toggle element is swung into alignment with the pin 24.

Means are provided to maintain the pin 24 in such orientation so as to maintain the toggle element 27 in a vertical position when the belt 16 is applied to the body of a workman so as to prevent accidental swinging of the toggle element into alignment with the pin and thereby prevent accidental removal of the pin from the aligned apertures. In the form shown, such means includes a keying portion 24b at one side of the pin 24 at a position to be confined within the bight 21 and cooperate with the correspondingly shaped side of the bight so as to prevent the pin 24 from rotating on its longitudinal axis. Because the pin 24 is prevented from rotating in the aligned apertures, the heavy end of the toggle element 27 will remain in depending position from the pivot 28.

In operation, as previously indicated, the workman will apply the belt 16 around his body in tight-fitting relation. When he desires to climb the tower, he will move the bifurcated rigid portions 19, 21, 22 of his safety belt into interfitting relation with the rigid outer end portion of the operating member 13 on the safety appliance 10. When the aperture 18 of the member 13 is aligned with the apertures 21a and 22a in the loops 21 and 22, the pin 24, with the toggle element 27 swung into alignment with the pin, is inserted through the aligned apertures so that the keying portion 24b is aligned with the corresponding keying portion in the bight 21. When the toggle element 27 projects outwardly through the aligned apertures, the toggle element will swing to the position shown in FIG. 1 and will maintain itself in this position. The workman may then ascend the tower by merely climbing on the steps 17 and using his hands in climbing. As he moves his body upwardly, an upward force is exerted on the operating member 13 so as to swing the same upwardly and permit the safety appliance 10 to move upwardly along the cable 11.

If at any time the workman should lose his footing or otherwise stop pulling upwardly through his belt upon the operating member 13, the friction shoe portion 15 will swing into locking relation with the cable 11. If the workman should lose his footing, so that all of his weight will be supported by the belt 16, his weight is immediately transferred to the pin 24 and operating member 13 with no hesitation and without any whipping action of the belt with respect to the safety appliance and as a result the possibility of a back injury is materially reduced. By virtue of the present invention, there can be no vertical shifting or vertical lost motion between the belt 16 and the rigid operating member 13 of the safety appliance.

Ordinarily the workman will, of course, be successful in preventing any possibility of his losing his footing and after having completed his work on the tower, he will descend the tower. In order to release the safety appliance 10 so as to permit downward movement along the cable 11 and tower 12, the workman will apply an inwardly directed force by manipulating his body inwardly toward the cable 11 and against the operating member 13 so as to move the member 13 inwardly toward the cable. When the member 13 is moved inwardly, the friction shoe portion 15 releases the safety appliance so as to permit downward movement by the workman. As the workman moves his body inwardly, the tight-fitting relation between the inner ends of the loops 21 and 22, and the opposite sides of the operating member 13, and the tight-fitting relation between the pin 24 and the aperture 18 in the operating member 13 prevents any wobbling movement of the operating member 13, and will normally maintain the operating member 13 in a position substantially perpendicular to the front of the workman's body so that there will be substantially no side sway whatsoever of the member 13 with respect to the front of the workman's body which would interfere with manipulation of the member 13 by means of his body. As a result of the use of the present invention, the workman may use both his hands to assist him in descending the tower 12 so as to substantially reduce the likelihood of his losing his grip on the tower.

When the workman reaches ground level, he will swing the toggle 27 into alignment with the pin and then remove the pin 24 so as to permit disassembly of the belt 16 from the safety appliance 10. The pin 24 may be stored on the belt so as to be immediately available for use when it is desired to use the belt in conjunction with the safety appliance.

It will be seen that I have provided a new and improved device for attaching a workman's safety belt to a safety appliance of the type used in climbing towers so that whipping action between the safety belt and the safety appliance when the workman loses his footing is substantially eliminated so as to materially reduce the possibility of a back injury and to also permit the workman to manipulate the safety appliance by use of his body so as to free the workman's hands for assisting in climbing downwardly along the tower.

It will, of course, be understood that various changes may be made in the form, detail, arrangement and proportion of the parts without departing from the scope of my invention which consists of the matter described herein and set forth in the appended claims.

What is claimed is:

1. Apparatus for securing a workman to the apertured control member of a safety appliance, said apparatus comprising a belt applicable to the workman's body in tight-fitting relation, a rigid structure affixed to the belt in a predetermined orientation, said rigid structure having a pair of outwardly projecting, side-by-side and spaced apertured portions to receive the apertured control member therebetween, the apertures of said spaced portions being horizontally aligned with each other, one of said apertures having a non-circular shape, a removable horizontally oriented pin projecting through the horizontally aligned apertures in said spaced portions and having a head at one end adjacent the non-circular aperture, the pin also having a non-circular shank portion adjacent the head and disposed in said non-circular aperture and being cooperatively shaped in relation to the non-circular aperture to prevent rotation of the pin about a longitudinal axis, said pin being adapted to extend through the aperture of said control member when the control member is assembled between the spaced portions of the rigid structure, the other end of said pin being bifurcated to define a vertical slot, a vertically oriented toggle element in the bifurcated end of the pin and extending transversely of the pin outwardly therefrom in both directions to prevent withdrawal of the pin from the apertures, and pivot means mounting the toggle element on the pin to provide for free swinging of the toggle element into alignment with the pin to permit removal of the pin from the apertures, the toggle element having upper and lower ends, the lower end of the toggle element being substantially heavier than the upper end to normally maintain the toggle element in vertically oriented position for preventing withdrawal of the pin from the apertures.

2. The invention set forth in claim 1 wherein said shank portion of the pin has a protruding keying portion at one side thereof, and the non-circular aperture in said rigid structure being cooperatively formed with respect to said keying portion to prevent rotation of the pin about a longitudinal axis, whereby to normally retain the lower end of the toggle element in depending position.

3. Apparatus for use in attaching a workman's safety belt to the apertured member of a safety appliance, said apparatus comprising a substantially continuous rigid belt-encompassing band adapted to be affixed to the belt in predetermined orientation, said band having a pair of outwardly projecting bights formed integrally thereof and adjacent each other, said bights defining a pair of horizontally aligned and generally tear-shaped openings therein, said bights being spaced apart to receive therebetween the control member of the safety appliance, a removable, horizontally oriented pin projecting through the openings of said bights, one end of the pin having a head thereon, the other end of the pin being bifurcated to define a vertical slot, the pin having a keying portion at one side thereof adjacent the head and cooperating with the tear-shaped opening in one of the bights to prevent rotation of the pin about a longitudinal axis, a vertically oriented toggle element in the slot of the pin and extending transversely of the pin outwardly therefrom in both directions to prevent withdrawal of the pin from the bights, the lower end of the toggle element being substantially heavier than the upper end thereof, whereby to normally maintain the toggle element in vertically oriented position, and pivot means mounting the toggle element on the pin and permitting free swinging of the toggle element into alignment with the pin to permit removal of the pin from the bights.

4. Apparatus for securing a workman to the apertured control member of a safety appliance, said apparatus comprising a belt applicable to the workman's body in tight-fitting relation, a rigid structure affixed to the belt in a predetermined orientation, said rigid structure having a a pair of outwardly projecting, side-by-side and spaced apertured portions to receive the apertured control member therebetween, the apertures of said spaced portions being horizontally aligned with each other, one of said apertures having a non-circular shape, an elongate pin having a rear shank portion and a front shank portion and having an enlarged head on said rear shank portion, the pin being removably mounted and horizontally oriented in the aligned apertures of said rigid structure, one of said shank portions of the pin being non-circular in shape and being disposed in said non-circular aperture and being cooperatively shaped with respect to the non-circular aperture to prevent rotation of the pin about a longitudinal axis, the rear shank portion of the pin being disposed in a respective aperture and being shaped to be longitudinally movable therein, the front shank portion of the pin being disposed in a respective aperture and being shaped with respect to both of the apertures to permit longitudinal movement of the pin through both apertures, said pin being adapted to extend through the aperture of the control member when the control member is assembled between the spaced portions of the rigid structure, the front shank portion of the pin being bifurcated to form a vertical slot, a vertically oriented toggle element in the slot and extending transversely of the first shank portion outwardly therefrom in both directions to prevent withdrawal of the pin from the apertures, and pivot means mounting the toggle element on the front shank portion to provide for free swinging of the toggle element into alignment with the front shank portion to permit removal of the pin from the apertures, the toggle element having upper and lower ends, the lower end of the toggle element being substantially heavier than the upper end to normally maintain the toggle element in vertically oriented position for preventing withdrawal of the pin from the apertures.

References Cited in the file of this patent

UNITED STATES PATENTS

| | | |
|---|---|---|
| 300,057 | Earnest | June 10, 1884 |
| 317,421 | Simons | May 5, 1885 |
| 325,221 | Wright | Aug. 25, 1885 |
| 730,876 | Christ | June 16, 1903 |
| 759,274 | Hallett | May 10, 1904 |
| 854,580 | John | May 21, 1907 |
| 1,576,210 | Nickson | Mar. 9, 1926 |
| 1,746,742 | Roberts | Feb. 11, 1930 |
| 1,836,462 | Fowler | Dec. 15, 1931 |
| 1,979,894 | Lyons | Nov. 6, 1934 |
| 2,246,359 | Jelinek et al. | June 17, 1941 |
| 2,805,016 | Brooking et al. | Sept. 3, 1957 |